(12) United States Patent
Collier et al.

(10) Patent No.: US 6,683,569 B1
(45) Date of Patent: Jan. 27, 2004

(54) NON-LINEAR TECHNIQUE FOR MITIGATING CORRELATION TIMING ERRORS DUE TO MULTIPATH SIGNALS

(75) Inventors: Richard Collier, Lawrenceville, GA (US); Howard Carnes, Suwanee, GA (US)

(73) Assignee: Electronic System Products, Inc., Duluth, GA (US)

( * ) Notice: Subject to any disclaimer, the term of this patent is extended or adjusted under 35 U.S.C. 154(b) by 0 days.

(21) Appl. No.: 10/054,770

(22) Filed: Jan. 22, 2002

Related U.S. Application Data
(60) Provisional application No. 60/263,360, filed on Jan. 22, 2001.

(51) Int. Cl.$^7$ ................................................. G01S 3/02
(52) U.S. Cl. ........................................ 342/465; 455/65
(58) Field of Search ............................... 342/387, 465, 342/453, 457; 455/456, 457, 65

(56) References Cited

U.S. PATENT DOCUMENTS

| | | | | |
|---|---|---|---|---|
| 5,630,208 A | * | 5/1997 | Enge et al. | .................... 455/65 |
| 6,009,334 A | * | 12/1999 | Grubeck et al. | ............ 455/456 |

OTHER PUBLICATIONS

Time of arrival estimation of narrowband TDMA signals for mobile positioning, S. Fischer et al., The Ninth IEEE International Symposium on Personal, Indoor and Mobile Radio Communications, vol. 1, p. 451–455, Sep. 1998.*

* cited by examiner

*Primary Examiner*—Thomas H. Tarcza
*Assistant Examiner*—F Mull

(57) ABSTRACT

The present invention is a method of determining the time of arrival of an incident signal transmitted utilizing a code word that is interspersed with noise and diffracted and reflected signals of the incident signal. The incident, diffracted and reflected signals and noise are collectively defined as a combined signal. The method comprises receiving the combined signal; obtaining the code word to apply to the combined signal; comparing the combined signal with the code word to filter the incident signal and diffracted and reflected signals arising from the incident signal from the combined signal; utilizing the incident signal and related diffracted and reflected signals to determine a first parameter indicative of the incident signal's time of arrival; and filtering the first parameter utilizing a multipath mitigation algorithm to mitigate the influence of the diffracted and reflected signals to obtain a second parameter indicative of the incident signal's time of arrival.

20 Claims, 13 Drawing Sheets

Receiver for a Radiolocation System for mitigating Correlator timing errors

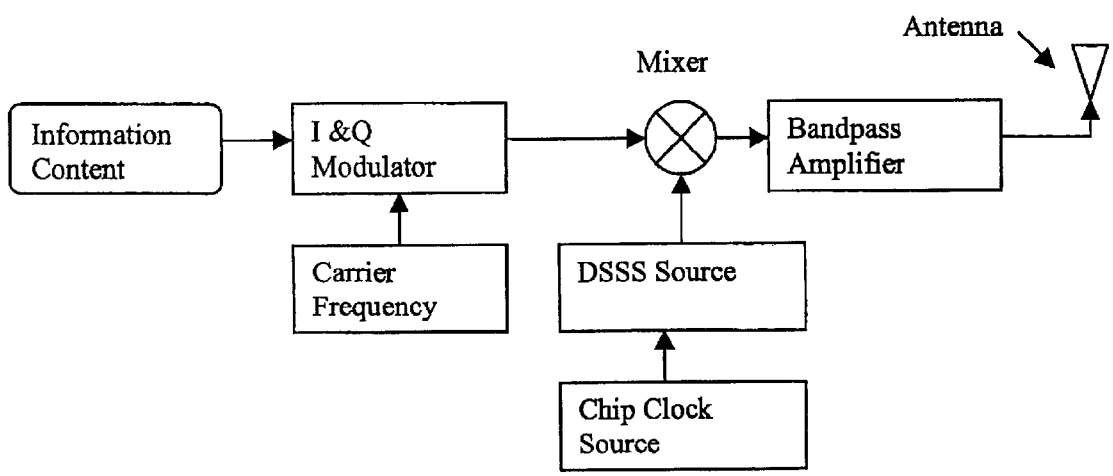
Figure 1. A typical Transmitter implementation for a Radio Locating System

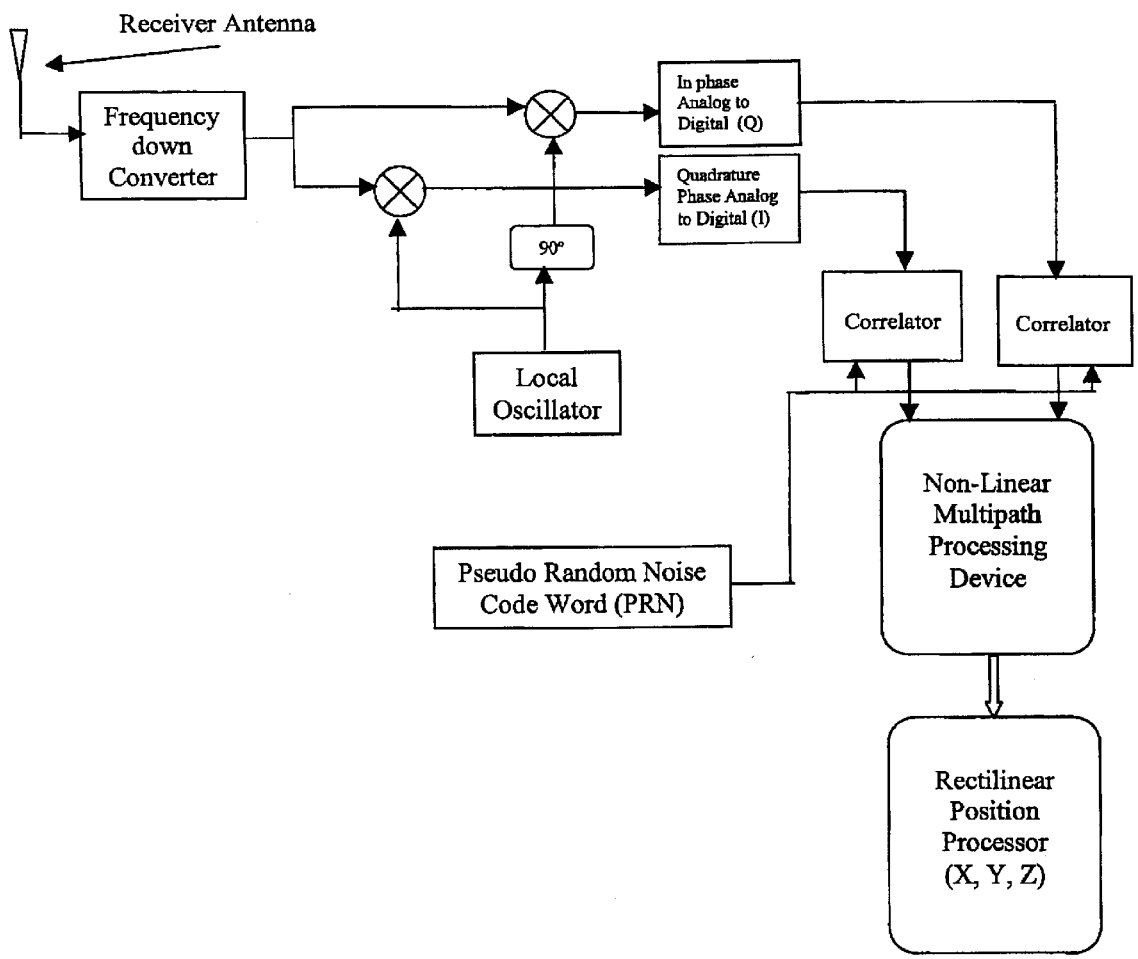
Figure 2. Receiver for a Radiolocation System for mitigating Correlator timing errors

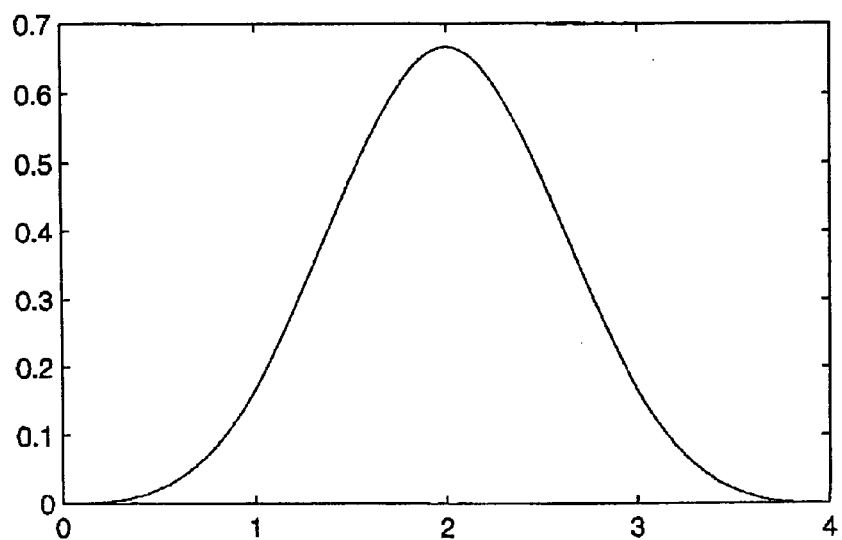
Figure 3. Cubic B-Spline

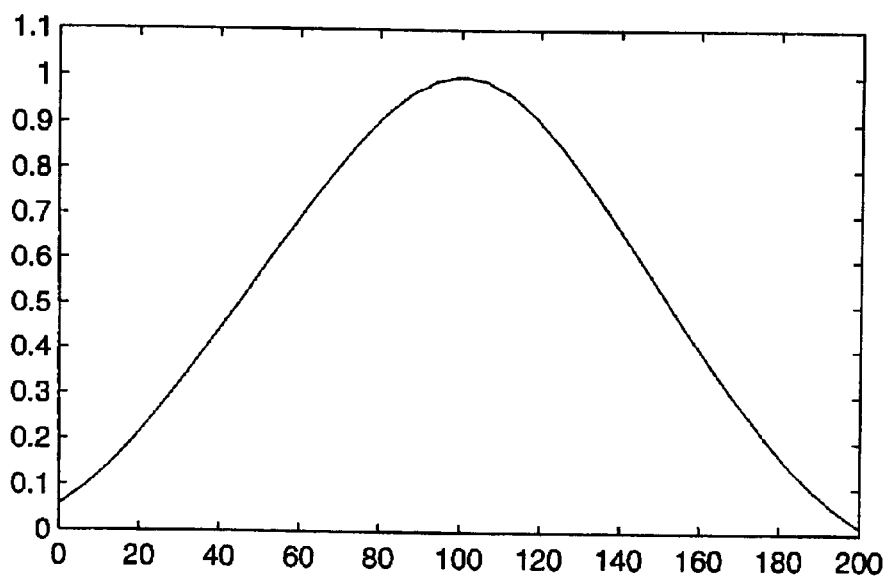
Figure 4. Normal Autocorrelation at Receiver

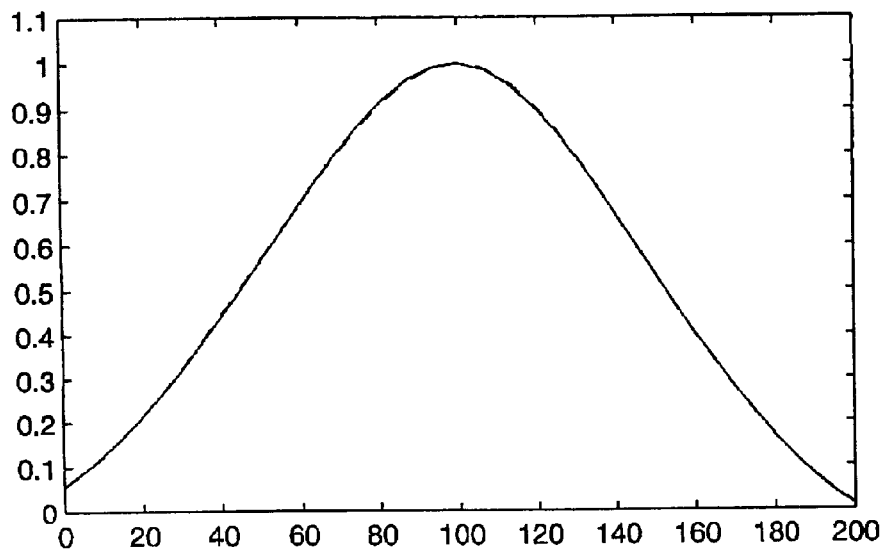
Figure 5. Measured Autocorrelation Curve - dashed
Cubic Spline Approximation - solid

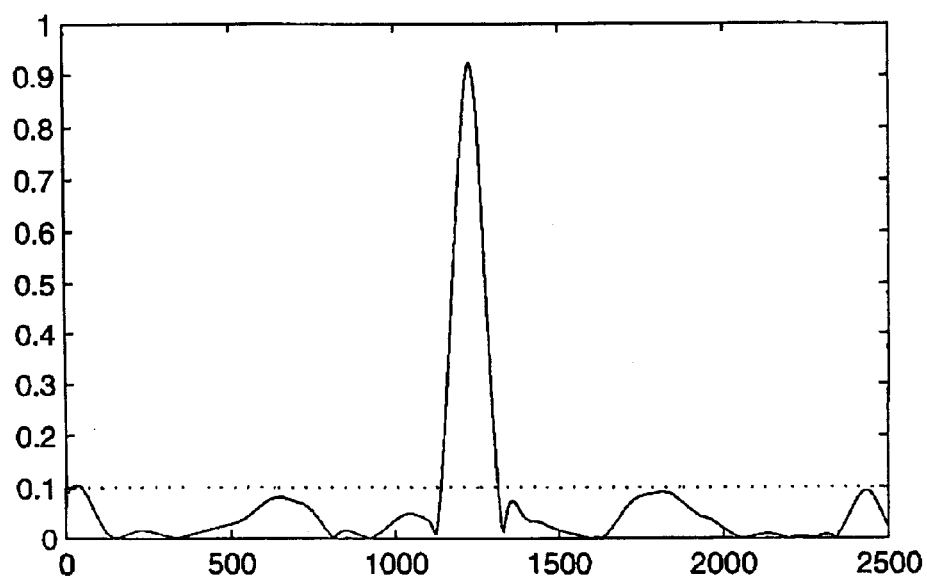
Figure 6. Correlation Noise Peak Model

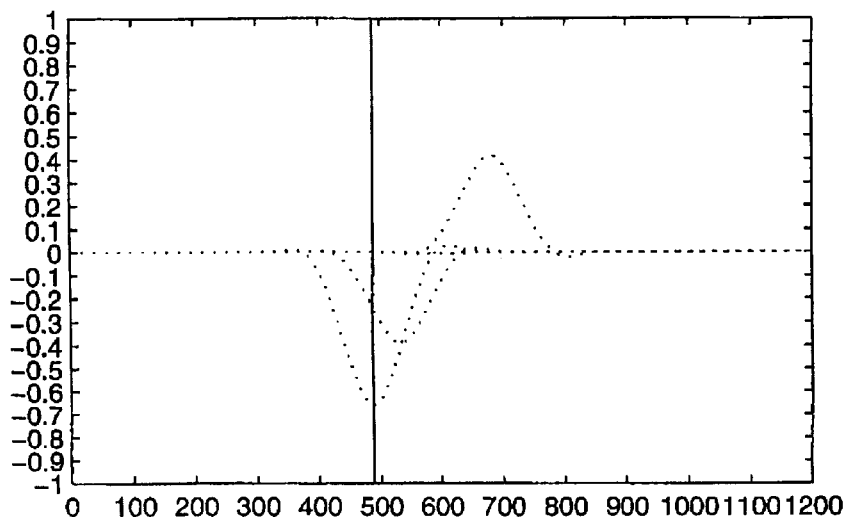
Figure 7. Inphase (I) Components of the Received Signal Correlator Output

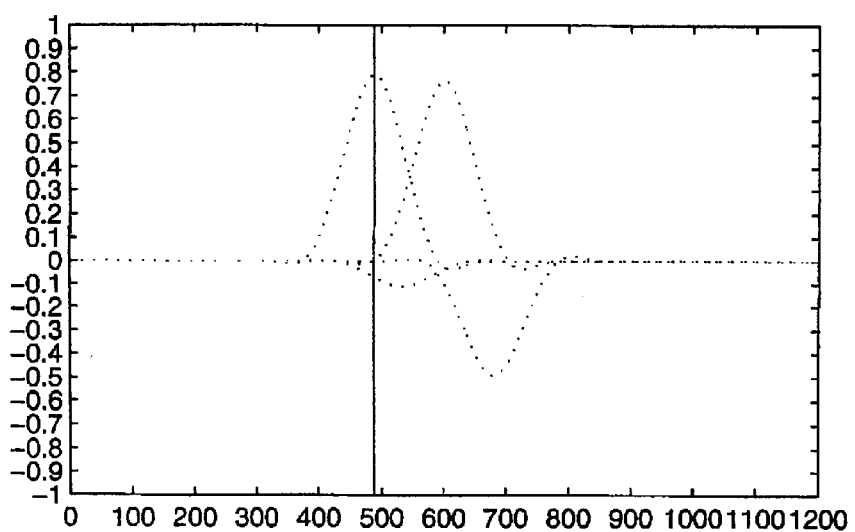
Figure 8. Quadrature Phase (Q) Components of the Received Signal Correlator Output

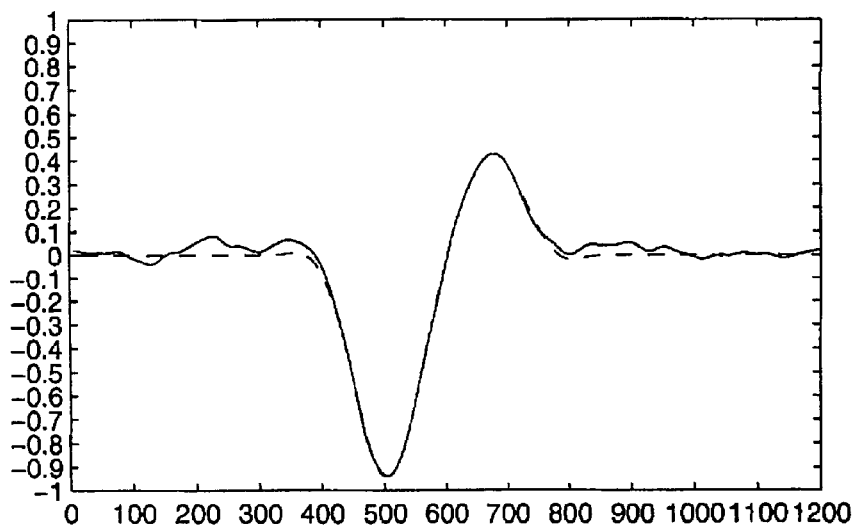
Figure 9. Comparison of a Simulated Inphase (I) Received Signal with the Output from the Non-Linear Multipath Processing Device

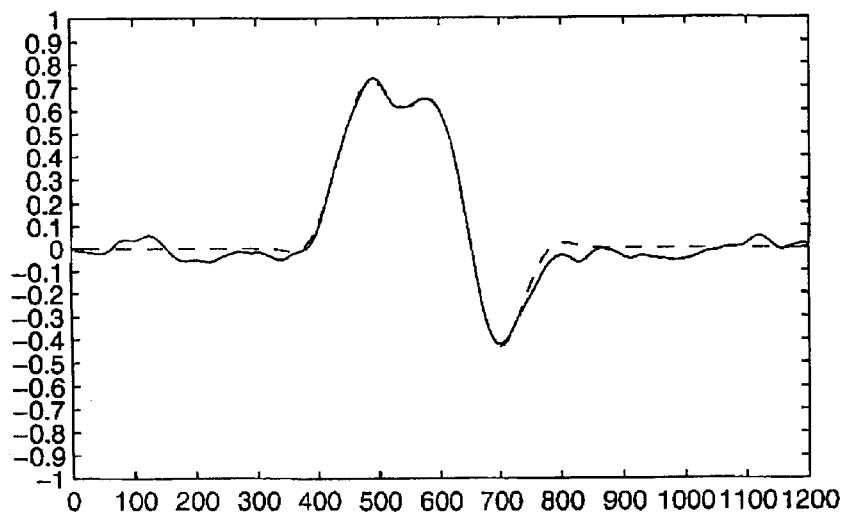
Figure 10. Comparison of a Simulated Quadrature Phase (Q) Received Signal with the Output from the Non-Linear Multipath Processing Device

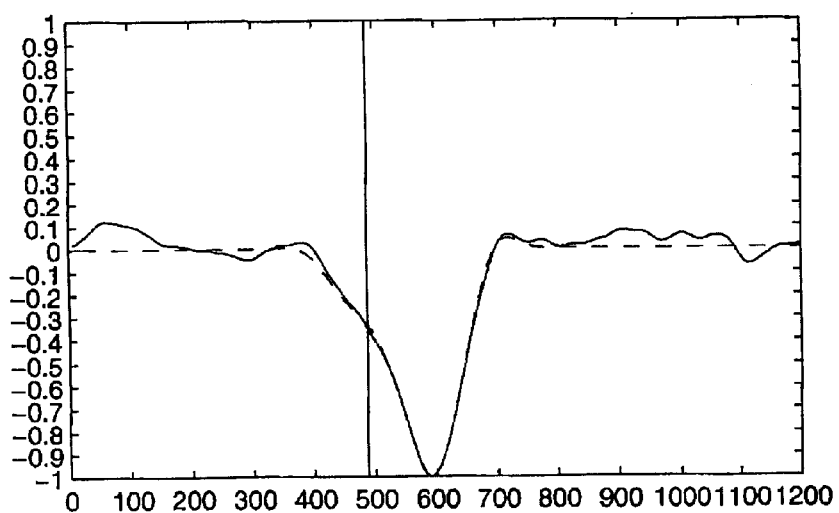
Figure 11. Non-Linear Multipath Processing Device Inphase (I) Output Performance

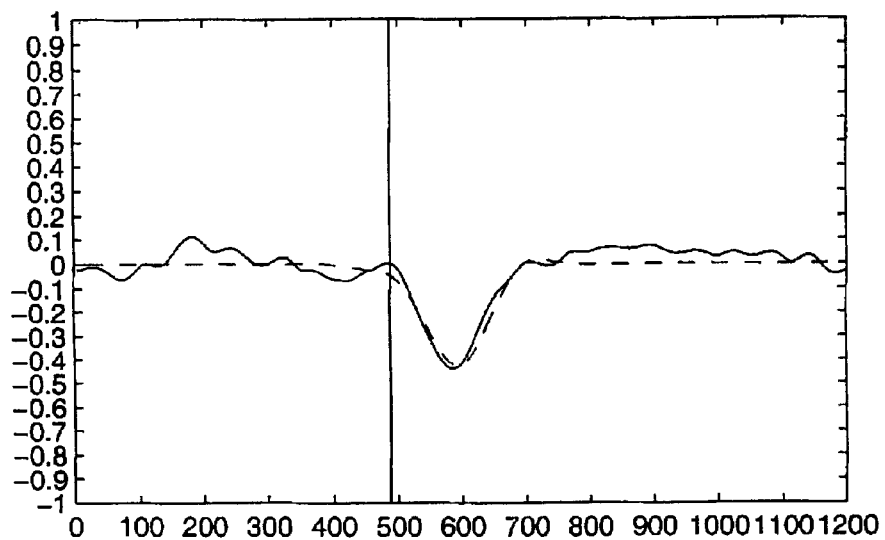
Figure 12. Non-Linear Multipath Processing Device Quadrature Phase (Q) Output Performance

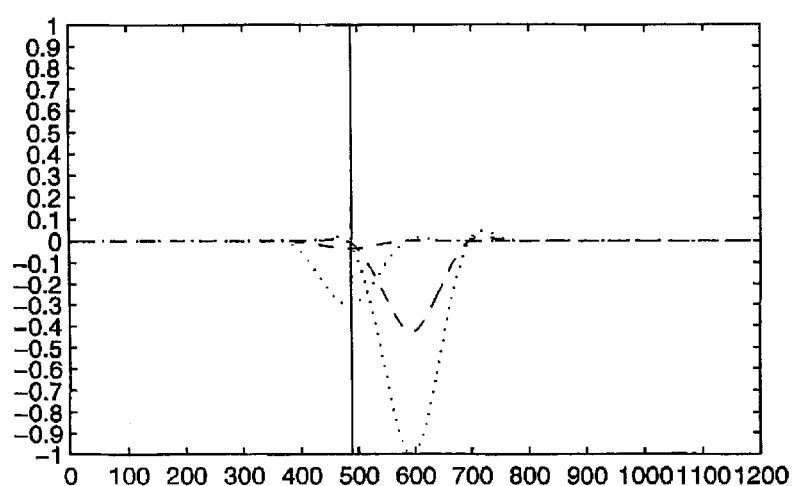
Figure 13. Non-Linear Multipath Processing Device Inphase (I) and Quadrature Phase (Q) Output Performance together

NON-LINEAR TECHNIQUE FOR MITIGATING CORRELATION TIMING ERRORS DUE TO MULTIPATH SIGNALS

This application claims priority from provisional application No. 60/263,360, filed on Jan. 22, 2001.

FIELD OF THE INVENTION

This invention relates to minimization of positioning errors that are experienced by radio locating systems in the presence of multipath signals that arrive from nearby diffractive features and reflective surfaces.

BACKGROUND OF THE INVENTION

Radiolocation schemes estimate location of objects to be tracked by measuring time parameters that include Time of Arrival or Time Delay of Arrival at a number of receivers at known locations. Other techniques include measuring Angle of Arrival or a composite of time and angle measures.

The accuracy of radiolocating system depends on an accurate time measurement of the time of the incident signal sent by the transmitting device to be located by the network of receiving antennas. In real operating environments it is improbable that only the antenna network receives only an incident (line of sight) signal. The transmitted signal also arrives at the antennas from indirect paths. Reflective surfaces, such as buildings, the ground, surrounding vehicles and other surfaces are sources of undesirable signal paths. Also, the transmitted signal may be diffracted by sharp edges of objects. These phenomena result in the transmitted signals traveling to the antenna networks via non-direct paths. The sum of all signal paths from the transmitter to the receivers results in a composite of multipath signals.

The combined signal at the receivers created by the incident (line of sight) and the diffracted and reflected (non-line of sight) signals creates an uncertainty as to the actual arrival time of the incident signal.

SUMMARY

The present invention overcomes the above-described problems in the prior art by providing a method of determining the time of arrival of an incident signal transmitted utilizing a code word that is interspersed with noise and diffracted and reflected signals of the incident signal. The incident, diffracted and reflected signals and noise are collectively defined as a combined signal. The method comprises receiving the combined signal; obtaining the code word to apply to the combined signal; comparing the combined signal with the code word to filter the incident signal and diffracted and reflected signals arising from the incident signal from the combined signal; utilizing the incident signal and related diffracted and reflected signals to determine a first parameter indicative of the incident signal's time of arrival; and filtering the first parameter utilizing a multipath mitigation algorithm to mitigate the influence of the diffracted and reflected signals to obtain a second parameter indicative of the incident signal's time of arrival.

DETAILED DESCRIPTION OF THE DRAWINGS

The invention will be more readily understood from a reading of the following specifications and by reference to the accompanying drawings forming a part thereof, wherein an example of the invention is shown and wherein:

FIG. 1 illustrates a typical Transmitter implementation for a Radio Locating System.

FIG. 2 illustrates a Receiver for a Radiolocation System for mitigating Correlator timing errors in the presence of Multipath Signals.

FIG. 3 illustrates the Cubic Spline method of estimating a receiver correlation pulse response.

FIG. 4 illustrates a Normal Autocorrelation Receiver output without received reflections.

FIG. 5 illustrates a Measured Received Signal and its Cubic Spline Approximation.

FIG. 6 illustrates a Correlation Noise Peak Model.

FIG. 7 illustrates the Inphase (I) components.

FIG. 8 illustrates the equivalent Q components $\alpha_{Q_k}$·corr (m,m)(t–$t_k$).

FIG. 9 compares the original correlator I output (solid) with the mitigation algorithm model (dashed).

FIG. 10 compares the correlator Q output (solid) with the mitigation algorithm Q model (dashed).

FIG. 11 compares the correlator I output (solid) with the mitigation algorithm model (dashed).

FIG. 12 compares the correlator Q output (solid) with the model Q data (dashed).

FIG. 13 presents both the Inphase (I) components (dotted) and the Quadrature Phase (Q) components (dashed).

The construction designed to carry out the invention will hereinafter be described, together with other features thereof.

DETAILED DESCRIPTION OF THE PREFERRED EMBODIMENTS

Turning now to the figures in which like numerals represent like elements throughout the several views, exemplary embodiments of the present invention are described. Radio locating systems use a variety of time measurement techniques that include Time of Arrival, Time Delay of Arrival and Angle of Arrival. This invention will improve the accuracy independently of the time measurement technique.

FIG. 1 illustrates a typical Transmitter that attaches to a device to be located using radio waves. A source of Information is modulated onto a Carrier that frequency translates the Information to a higher frequency band. Prior to transmission a Pseudo Random Serial Data Stream then modulates the Information at the Carrier Frequency. This modulation process is commonly referred to as Direct Sequence Spread Spectrum (DSSS) or generically, spreading the transmission. A key point is that the common practice is to use a spreading code word that has a high autocorrelation and low cross-correlation characteristic.

FIG. 1 is a typical implementation of a transmitting device attached to an object to be located in a radiolocation scheme. The transmitter may have some Information Content that needs to be sent to the radiolocation network. For example the Information Content might be an intrusion detection sensor status. The information baseband is frequency translated to a frequency suitable to the radiolocation network application. A Carrier Frequency is applied to the I (Inphase) and Q (Quadrature-phase) Modulator that translates the Information Content to the desired radio frequency. The resultant signal has a finite bandwidth that is applied to, the input port of a common Mixer. The spreading signal is generated by the DSSS Source. The chip rate of the DSSS Source is determined by the Chip Clock Source. The frequency-spread signal is amplified and band limited by the Bandpass Amplifier and is launched into the air by the Antenna.

A network of receiving antennas receives the DSSS signal after the propagation of the signal through the air from the transmitter Antenna. Each receiving antenna gets the signal at times set by the respective distances between the Transmitter and individual Receivers.

A network of Radio Receivers is utilized to receive the combined signal. The combined signal at the receivers is created by the incident (line of sight) and the diffracted and reflected (non-line of sight) signals.

FIG. 2 illustrates a Receiver for a Radiolocation System for mitigating Correlator timing errors in the presence of Multipath Signals. FIG. 2 illustrates the significant components, including the Non-Linear Multipath Processing Device that improves the accuracy of locating a Transmitter in the presence of multipath signals. The combined signal arrives at a number of Antennas and is processed with the Receiver shown in FIG. 2. The Antenna transfers the combined signal to a Frequency Downconverter for convenience of processing the information. An Inphase and Quadrature Demodulator comprised of two diode mixers, a 90° Phase Shifter and a Local Oscillator. The signal is demodulated and decomposed into In-phase (I) and Quadrature-phase (Q) components. Each component, Q, and I is converted from an analog to a digital signal for time information extraction. A copy of the Transmitter's DSSS code word is sent to the Correlator for detection of the Transmitter's signal.

Quadrature Component Data (Q) data and Inphase (I) data is fed to the Correlators to extract the arrival time information. With only an incident signal the time measurement accuracy is limited to the processing circuitry and stability of local clocks. However the more typical case is when reflected signals add to the incident signal that the time measurement accuracy is limited by distortions created multiple copies of the incident wave delayed in time.

The problem becomes how to extract the time of arrival of the incident signal when corrupted with multiple path signals. The Non-Linear Multipath Processing Device estimates the composition of the incident and reflected signals and eliminates the measurement distortion to find the arrival time of the incident signal.

The corrected time information, from each radiolocation network receiver, is then sent to the Rectilinear Position Processor to determine the X, Y, and Z coordinates of the Transmitters location.

The Transmitter and Receiver clocks are not assumed to be phase-locked. That is, the transmitter carrier and receiver local oscillators may be out of phase. Each multipath signal is essentially the same as the original modulated carrier except for a phase shift, time shift, and amplitude change. We describe the combined signal received as follows:

$m(t)$=modulation as a function of time in seconds $\omega$=transmitter carrier frequency in rad/s $\gamma$=phase of the receiver local oscillator in radians $\beta_k$=amplitude of signal k, incident or multipath $\theta_k$=phase shift of signal k in radians $t_k$=time delay of signal k in seconds $\qquad$ (0.1)

Then the received signal including the incident and all multipath signals is described by:

$$s(t) = \sum_k \beta_k m(t - t_k)\cos(\omega(t - t_k) + \theta_k) \qquad (0.2)$$

The time delays are assumed ordered by index. The propagation delay of the incident wave is $t_0$. The received signal is down-converted using the familiar trigonometric identity:

$$\cos(x)\cos(y) = \tfrac{1}{2}\cos(x+y) + \tfrac{1}{2}\cos(x-y) \qquad (0.3)$$

The receiver local oscillator output is $\cos(\omega t+\gamma)$ and $\cos(\omega t+\gamma\pi/2)$ for an I/Q demodulator. The down-converted receiver signal is then:

$$I(t) = \sum_k \beta_k m(t - t_k)\cos(\gamma + \omega t_k - \theta_k) \qquad (0.4)$$

$$Q(t) = \sum_k \beta_k m(t - t_k)\sin(\gamma + \omega t_k - \theta_k)$$

We can represent these signals in complex form by associating the real part, as I and the imaginary part as Q. The coefficients of the time-shifted modulation are then:

$$\alpha_k = \beta_k[\cos(\gamma+\omega t_k - \theta_k) + j\cdot\sin(\gamma+\omega t_k - \theta_k)] \qquad (0.5)$$

The complex valued baseband signal is then simply:

$$s_B(t) = \sum_{k=0}^{N_r} \alpha_k m(t - t_k), \; \alpha_k \text{ complex}, N_r \text{ multipaths} \qquad (0.6)$$

The number of significant multipath signals is $N_r$. A significant signal has a measurable effect on the receiver correlator output. What is needed is a technique to find $N_r$, $\{\alpha_k\}$ and $\{t_k\}$.

Correlation

Timing accuracy depends on the correlation properties of the reference signal. We assume that the reference signal is present in the received baseband signal, $s_B(t)$, and attempt to correlate with it. Then, since correlation is linear, we have:

$$\operatorname{corr}(s_B, m)(t) = \sum_{k=0}^{N_r} \alpha_k \operatorname{corr}(m, m)(t - t_k) \qquad (1.1)$$

Where the continuous correlation for real functions $f$ and $m$ is defined as:

$$\operatorname{corr}(f, m)(t) = \int_{-\infty}^{\infty} f(u + t) m(u) \, du \qquad (1.2)$$

In practice, we approximate the correlation function with a discrete sum at the system Analog to Digital Conversion I/Q Sampling rate. The modulation signals, here $m(\cdot)$, is finite so that (1.2) is really a finite integral or sum. From equation (1.1), we see that the correlation of the received signal with the reference signal is a sum of time shifted copies of the autocorrelation function of the reference signal, $\operatorname{corr}(m,m)(t)$, with coefficients $\{\alpha_k\}$ and time shifts $\{t_k\}$. The information of interest is $t_0$, the time of arrival of the incident wave at the receiver.

The correlation of the received signal (without multipath but distorted by filtering in the transmitter and receiver) with the original modulating signal with be called autocorrelation. The correlation of the received signal including several possible multipath signals with the modulating signal will be referred to simply as correlation. That is, the sampled autocorrelation function is at the receiver where one of the reference signals originated as the modulation at the transmitter.

Splines

The autocorrelation function of the modulating signal is distorted due to filtering in the transmitter and receiver. This response is difficult to obtain analytically. In order to use non-linear filtering techniques later, we need to approximate the autocorrelation response at the receiver with a smooth curve that has a continuous derivative. To accomplish this, we use a least squares cubic spline. The data to fit is the sampled autocorrelation response at the receiver I/Q output.

A function $f(x)$ is a cardinal spline of order n provided that:

$$f \in C^{n-2} \text{ and } f|_{[k,k+2)} \in \pi_{n-1}, k \in \square \quad (2.1)$$

That is, $f$ has n−2 continuous derivatives and $f$ restricted to the interval [k,k+1) is a polynomial of degree at most n−1. This implies that the polynomial pieces match up smoothly at the integers, $k \in \square$. The endpoints of these intervals are called knots. We will use n=4- cubic splines with 2 continuous derivatives and integer knots. A basis for the cardinal spline space of order n are the $n^{th}$ order cardinal B-splines, $B_n(t)$. The cardinal B-splines can be defined explicitly as:

$$B_n(t) = \frac{1}{(n-1)!} \sum_{k=0}^{n} (-1)^k \binom{n}{k} (t-k)_+^{n-1}, \quad (2.2)$$

$$\text{where } t_+^{n-1} = \begin{cases} t^{n-1} & t \geq 0 \\ 0 & \text{otherwise} \end{cases}$$

The cardinal B-splines may be defined recursively as:

$$B_n(t) = (B_{n-1} * B_1)(t) = \int_0^1 B_{n-1}(u-t)du, B_1(t) = \chi_{[0,1)} \quad (2.3)$$

Where $\chi_{[0,1)}$ is the characteristic function on the interval [0,1). The Cardinal B-splines have support [0,n] and are symmetric relative to their support as shown in FIG. 3.

FIG. 3 illustrates the Cubic Spline method of estimating a receiver correlation pulse response. Using this basis, a cardinal spline can be represented as a sum of centered and shifted cardinal B-splines as follows:

$$f(t) = \sum_{k=0}^{N} c_k B_n(t+n/2-k) \quad (2.4)$$

The derivative $f'(t)$ will be needed later. Cubic splines have two continuous derivatives. The first derivative can be derived using the formula:

$$B'_n(t) = B_{n-1}(t) - B_{n-1}(t-1) \quad (2.5)$$

Equation (2.5) is substituted into (2.4) to yield a formula for generating the first derivative:

$$f'x = \sum_{k=0}^{N} c_k B'_n(x+n/2-k) \quad (2.6)$$

-continued
$$= \sum_{k=0}^{N} c_k \{B_{n-1}(x+n/2-k) - B_{n-1}(x-1+n/2-k)\}$$

The autocorrelation of the modulating signal (as measured at the receiver) is modeled using a least squares cubic spline as in (2.4) with n=4. A typical autocorrelation of a PN sequence is shown in FIG. 4.

FIG. 4 illustrates a Normal Autocorrelation Receiver output without received reflections. It is necessary to find the coefficients $\{c_k\}$, k=0, . . . ,N in equation (2.4) so that the spline function $f(t)$ is approximately equal to the measured autocorrelation function corr(m,m)(t) at the sampled values. An assumption is made that there are $2^j \cdot (N+1)$ total sample points with $j \geq 1$. Samples therefore occur at $t=2^{-j} \cdot i, i=0, \ldots, N_s$ where $N_s=2^j \cdot (N+1)-1$.

$$corr(m,m)(2^{-j} \cdot i) \cong \sum_{k=0}^{N} c_k B_n\left(2^{-j} \cdot i + \frac{n}{2} - k\right), i = 0, \ldots, N_s \quad (2.7)$$

This is an over-determined system of linear equations. There are $N_s+1$ equations in the n+1 unknowns $\{c_k\}$, k=0, . . . , N.

$$a_{ik} = B_n\left(2^{-j} \cdot i + \frac{n}{2} - k\right),$$

The (unweighted) least square solution is $$\hat{c} = (A^T A)^{-1} A^T z \quad (2.9)$$

The solution $\hat{c}$ minimizes the residual sum of squares J(c) where $$J(c) = (z-Ac)^T(z-Ac) \quad (2.10)$$

Once the coefficients $\{c_k\}$ are computed, equations (2.4) and (2.6) are used to generate a table of ideal autocorrelation values and the first derivative of the ideal autocorrelation. The number of coefficients required in (2.4) is generally small as evidenced by FIG. 5 where only 5 coefficients are used with 32 sampled data points. FIG. 5 illustrates a Measured Received Signal and its Cubic Spline Approximation. The least squares cubic spline curve is superimposed on the measured autocorrelation curve to illustrate the accuracy of the approximation.

In practice, the sampled autocorrelation values are scaled to the resolution $2^{-j}$. The tables for the ideal autocorrelation and derivative are generated using equations (2.4) and (2.6). The tables are then (implicitly) scaled back to the system sampling resolution.

The importance of the least squares cubic spline curve in generating the ideal autocorrelation and derivative tables is twofold:

The cubic spline has two continuous derivatives. The convergence of the iterative algorithm used later depends on the continuity of the first derivative.

Artificial local maximums or minimums caused by sampling the noisy receiver data at a high rate are removed. This prevents the iterative solution from being captured at a local max or min instead of converging toward the desired result.

Multipath Mitigation Algorithm

The proposed solution to the multipath problem is to find $N_r$, $\{\alpha_k\}$, and $\{t_k\}$ for k=0, . . . , $N_r$. Then the TOA is simply $t_0$. The algorithm used is a recursive iterated extended Kalman filter. The recursion is on the number of multipath signals, $N_r=0,1,2,\ldots$. For each value of $N_r$, the non-linear equations involving $\{\alpha_k\}$ and $\{t_k\}$ are solved by an iterated extended Kalman filter. Unique to this algorithm is the measurement noise model based on the process gain of a PN sequence and the termination criteria for $N_r$ based on a least square $\chi^2$ statistic from the Kalman filter. In practice, a final value of $N_r=2$ is sufficient to resolve most multipath signals. The $\chi^2$ statistic from the Kalman filter is used to generate a one-sided confidence interval (typically 95%) for the dimension $N_r$ of the multipath model.

Correlation Noise Model

The measurement data in this problem is the sampled receiver correlator I/Q output. The correlator integrates over the time period of the PN sequence or other modulating signal. The autocorrelation of a single burst of a typical PN code has a two chip wide peak and multiple side peaks. The process gain of the PN code is defined as the ratio, of the amplitude in this peak to the amplitude of the next closest side peak. The gain is related to the length of the code. The measurement noise model used in the Kalman filter (see section 5.3) is as follows:

$z$=normalized measured $I$ or $Q$ $\sigma_z = A_s \cdot e^{-k|z|} + \sigma_{Peak}$ $A_s$=amplitude of largest side peak $k$=gain constant $\sigma_{Peak}$=sample noise std. dev. at peak   (3.1)

The I/Q samples above a threshold determined by the receiver design and AGC State are first normalized. Each I/Q sample is a measurement z in the Kalman filter. The covariance of the measurement noise $\sigma_z^2$ is computed using equation (3.1). The gain k is chosen so that, $\sigma_z \cong \sigma_{Peak}$, at the correlation peak. In practice, $A_s$ and $\sigma_{Peak}$ are a function of the receiver AGC state. FIG. 6 illustrates a Correlation Noise Peak Model. FIG. 6 illustrates the measurement noise model for a typical single correlation peak. The received signal has an SNR of 0 dB. The dotted line indicates the level $A_s$.

$\chi^2$ Termination Statistic

The (weighted) least square problem is summarized in equation (3.2). Under the assumption that the measurement noise is normally distributed with a zero mean, it can be shown that the minimized least squares cost function $J^* = J(\hat{x})$ is $\chi^2$ distributed with $n_z - n_x$ degrees of freedom. Note that cost function $J(x)$ in equation (3.2) now includes the covariance of the measurement noise R in contrast to equation (2.10).

$x$—unknown state vector of dimension $n_x$ $z$—measurement vector of dimension $n_z$ $H$—linear measurement matrix of dimension $n_z \times n_x$ $v$—noise vector of dimension $n_z, v \square N(0,R)$ $z = Hx + v$ $J(x) = (z-Hx)^T R^{-1}(z-Hx)$   (3.2)

The Iterated Extended Kalman filter (described below) is used within the iterations without a priori information. The above statistic is therefore valid at the last iteration where H is the Jacobian of the non-linear measurement equation evaluated at the converged solution $\hat{x}$. If the statistic $J^*$ falls within the one-sided 95% confidence interval for a $\chi^2$ distribution with $n_z - n_x$ degrees of freedom, the recursion on $N_r$ is terminated. Note that a prerequisite is that the Iterated Extended Kalman filter converges at this step.

Kalman Filter

The output of the receiver correlator is the complex correlation of the superposition of the incident and all diffracted and reflected multipath signals with the modulating signal, typically a Pseudo Random Noise (PRN) code. The (complex-valued) correlation is modeled by equation (3.3). The correlation is the sum of time shifted sampled autocorrelation with complex amplitude coefficients $\{\alpha_k\}$ and continuous time shifts $\{t_k\}$, where $k=0, \ldots, N_r$. The discrete sample times are $\{t_i\}$, $i=1, \ldots, N_s$.

$$corr(S_B, m)(t_i) = \sum_{k=0}^{N_r} \alpha_k corr(m, m)(t_i - t_k), \; i=1, \ldots, N_s \quad (3.3)$$

The real and imaginary parts of the correlation are designated by $I_i$ and $Q_1$ as in equation (3.4). In practice, these are the normalized sampled receiver correlator outputs.

$I_i = Re(corr(S_B, m)(t_i))$   (3.4)

$= \sum_{k=0}^{N_r} Re(\alpha_k) corr(m, m)(t_i - t_k)$ $Q_i = Im(corr(S_B, m)(t_i))$ $= \sum_{k=0}^{N_r} Im(\alpha_k) corr(m, m)(t_i - t_k)$ To eliminate all complex arithmetic we use the definitions in equation (3.5):

$\alpha_{Ik} = Re(\alpha_k)$ $\alpha_{Qk} = Im(\alpha_k)$ $x = (t_0, \ldots, t_{N_r}, \alpha_{I0}, \ldots, \alpha_{IN_r}, \alpha_{Q0}, \ldots, \alpha_{QN_r})^T$ $h(x) = (I_1, \ldots, I_{N_s}, Q_1, \ldots, Q_{N_s})^T$ $z_{Ii} = I_i + v_{Ii}, v_{Ii}$=measurement noise $z_{Qi} = Q_i + v_{Qi}, v_{Qi}$=measurement noise $z = (z_{I1}, \ldots, z_{IN_s}, z_{Q1}, \ldots, z_{QN_s})^T$   (3.5)

The non-linear measurement equation relative to the multipath model (3.3) is given by equation (3.6). Here the covariance of the measurement noise vector v is assumed diagonal with each diagonal entry computed as in equation (3.1) with z replaced by either $I_i$ or $Q_i$ for $i=1, \ldots, N_s$.

$z = h(x) + v$, where $v = (v_{I1}, \ldots, v_{IN_s}, v_{Q1}, \ldots, v_{QN_s})^T$ $E[v_{Ii}] = 0$ $E[v_{Ii}^2] = (A_s \cdot e^{-k|I^i|} + \sigma_{peak})^2$ $E[v_{Qi}] = 0$ $E[v_{Qi}^2] = (A_s \cdot e^{-k|Q^i|} + \sigma_{peak})^2$   (3.6)

The multipath effects can be mitigated by the solution of the non-linear measurement model presented by equations (3.3) through (3.6). The time shift $t_0$ is then used as the time of arrival of the incident signal. The solution of this problem (for a fixed value of $N_r$) is the well-known iterated extended Kalman filter. Unique to the multipath problem are the measurement noise model as described in section (5.1) and the recursion on the number of multipath signals as described in section (5.2). The extended Kalman filter is a linearization of the non-linear measurement function (3.6) using a first order Taylor's series. The Jacobian of h(x) is required and computed in equation (3.7).

$$H = \frac{\partial h}{\partial x} \quad (3.7)$$

$$= \begin{pmatrix} \frac{\partial I_1}{\partial t_0} & \cdots & \frac{\partial I_1}{\partial t_{N_r}} & \frac{\partial I_1}{\partial \alpha_{I0}} & \cdots & \frac{\partial I_1}{\partial \alpha_{IN_r}} & 0 & \cdots & 0 \\ & & & \vdots & & & & & \\ \frac{\partial I_{N_s}}{\partial t_0} & \cdots & \frac{\partial I_{N_s}}{\partial t_{N_r}} & \frac{\partial I_{N_s}}{\partial \alpha_{I0}} & \cdots & \frac{\partial I_{N_s}}{\partial \alpha_{IN_r}} & 0 & \cdots & 0 \\ \frac{\partial Q_1}{\partial t_0} & \cdots & \frac{\partial Q_1}{\partial t_{N_r}} & 0 & \cdots & 0 & \frac{\partial Q_1}{\partial \alpha_{Q0}} & \cdots & \frac{\partial Q_1}{\partial \alpha_{QN_r}} \\ & & & \vdots & & & & & \\ \frac{\partial Q_{N_s}}{\partial t_0} & \cdots & \frac{\partial Q_{N_s}}{\partial t_{N_r}} & 0 & \cdots & 0 & \frac{\partial Q_{N_s}}{\partial \alpha_{Q0}} & \cdots & \frac{\partial Q_{N_s}}{\partial \alpha_{QN_r}} \end{pmatrix}$$

The first $N_s$ rows of the Jacobian relative to the $I_i$ samples are computed easily in equation (3.8).

$$\frac{\partial I_i}{\partial t_s} = \frac{\partial}{\partial t_s} \sum_{k=0}^{N_r} \alpha_{Ik} corr(m, m)(t_i - t_k) \quad (3.8)$$

$$= \alpha_{Is} \frac{\partial}{\partial t_s} corr(m, m)(t_i - t_s)$$

$$= \alpha_{Is} \frac{d}{dt} corr(m, m)(t) \Big|_{t=t_i-t_s}$$

$$\frac{\partial I_i}{\partial \alpha_{Is}} = corr(m, m)(t_i - t_s)$$

$$\frac{\partial I_i}{\partial \alpha_{Is}} = 0$$

The last $N_s$ rows of the Jacobian relative to the $Q_i$ samples are directly analogous and are computed in equation (3.9).

$$\frac{\partial Q_i}{\partial t_s} = \alpha_{Qs} \frac{d}{dt} corr(m, m)(t) \Big|_{t=t_i-t_s} \quad (3.9)$$

$$\frac{\partial Q_i}{\partial \alpha_{Is}} = 0$$

$$\frac{\partial Q_i}{\partial \alpha_{Is}} = corr(m, m)(t_i - t_s)$$

The Taylor's series for h(x) expanded about $x_0$ is given by equation (3.10). The Jacobian is evaluated using equations (3.7) through (3.9).

$$h(x) \cong h(x_0) + \left(\frac{\partial h}{\partial x}\right)_{x_0} (x - x_0) \quad (3.10)$$

$$= h(x_0) + \left(\frac{\partial h}{\partial x}\right)_{x_0} x - \left(\frac{\partial h}{\partial x}\right)_{x_0} xo$$

or $$h(x) - h(x_0) + \left(\frac{\partial h}{\partial x}\right)_{x_0} x_0 = \left(\frac{\partial h}{\partial x}\right)_{x_0} x$$

In order to write equation (3.10) as a linearized Kalman filter equation, we rewrite the measurement equation as in (3.11) and substitute for h(x) in the (last line of) equation (3.10).

$$h(x) = z - v \quad (3.11)$$

The resulting equation, (3.12), is now a linear measurement equation with additive noise. Note that the actual measurement z is now replaced by the pseudo-measurement on the left side of equation (3.12).

$$z - h(x_0) + \left(\frac{\partial h}{\partial x}\right)_{x_0} = \left(\frac{\partial h}{\partial x}\right)_{x_0} x + v \quad (3.12)$$

Note that all functions involved are based on the sampled autocorrelation and it's derivative. These values are interpolated from the tables computed in section (4). Linear interpolation is adequate. Interpolation is necessary since the values $t_i - t_k$ are not necessarily in the table.

$$\frac{d}{dt} corr(m, m)(t) \quad (3.13)$$

The multipath mitigation algorithm is now summarized. A threshold is set for the receiver correlator output. If $|(I,Q)|$ exceeds this threshold, $N_s$ samples are taken and normalized to produce the measurement vector z as in equation (3.5). The number of multipath signals $N_r$ is initialized to 0. The following three steps are performed until a solution is reached or the available processing is exceeded:

Step 1: Compute the Initial State Estimate, $x_0$. The times $\{t_k\}, k=0, \ldots, N_r$ are equally spaced in the sample interval $[t_1, t_{N_s}]$. The coefficients are initialized as $\alpha_{Ik} = \alpha_{Qk} = \sqrt{2}/2$, $k=0, \ldots, N_r$.

Step 2: Compute the Kalman filter state estimate $\hat{x}$ from equation (3.12), then compute the Relative Error $|x_0 - \hat{x}|/|x_0|$. If the relative error is small, say 0.0005 or three digits; at this point convergence is achieved—go to step 3. Otherwise, set $x_0 = \hat{x}$ and repeat step 2.

Step 3: Compute the $\chi^2$ statistic $J^* = J(\hat{x})$ as in equation (3.2). If $J^*$ is in the 95% Confidence Interval for a $\chi^2$ variable with $n_z - n_x$ degrees of freedom, then move onto step 4. Otherwise increment $N_r$ and go to step 1.

Step 4: Accept $t_0$ as the TOA.

If during any step the allotted time or resources is used up then the algorithm is terminated without giving an answer for the TOA. In this case the data associated with this receiver is discarded.

Simulation Examples

This algorithm was simulated with a 63-chip PN code with a chip rate of 20 MHz. The transmitter signal was BPSK modulated with a bandwidth of 20 MHz. The receiver bandwidth was set at 20 MHz and additive white Gaussian noise (AWGN) was added to the received signal to bring the SNR to 0 dB. Three random multipath signals were added with random phase, time delay and amplitude. The combined signal was demodulated and correlated with the PN code. The resulting correlator, Inphase (I) and Quadrature Phase (Q) outputs were then processed with the multipath mitigation algorithm. Several illustrative examples are now given.

FIGS. 7, 8 and 9 are from a signal with three distinct multipath components. The multipath mitigation algorithm decomposes the receiver correlator output into a superposition of time shifted sample autocorrelation as in equation (3.4). FIG. 7 illustrates the Inphase (I) components. The vertical line is at the TOA of the incident signal, which should coincide with the peak of the first I components. Each dotted peak represents an Inphase (I) component of the form $\alpha_{1k}\cdot\text{corr}(m,m)(t-t_k)$.

FIG. 8 illustrates the equivalent Q components $\alpha_{Qk}\cdot\text{corr}(m,m)(t-t_k)$. Note that the vertical line representing the Time Of Arrival of the incident signal is also at the peak of the first Quadrature Phase (Q) component since the Inphase (I) and Quadrature Phase (Q) components share the same time shift $t_k$.

FIG. 9 compares the original correlator I output (solid) with the mitigation algorithm model (dashed). Note that the fit is very good at the peaks. The noise model of section 5.1 emphasizes the peak data and de-emphasizes the noisy data near 0. The 0 dB SNR of the original signal is apparent away from the peaks.

FIG. 10 compares the correlator Q output (solid) with the mitigation algorithm Q model (dashed). Note that the multiple distorted peaks have been accurately modeled.

FIGS. 11, 12 and 13 are an example of shallow (close to the Transmitter being tracked) reflections or refraction partially canceling out the incident signal correlation peak. As before, the vertical line occurs at the incident signal correlation peak, which is, absent in both the Inphase (I) and Quadrature (Q) correlation. The model data (dashed) is a good fit to the correlator output (solid) even though only one multipath signal ($N_r=1$) is modeled. The first Inphase (I) and Quadrature Phase (Q) correlation peaks occur at the Time Of Arrival of the incident signal that occurs at the vertical line. Note that the first recognizable peak in the raw data would have produced a Time of Arrival error on the order of 100 nanoseconds (approximately 100 feet). The multipath mitigation algorithm as illustrated in FIG. 13 has salvaged this corrupted data.

FIG. 11 compares the correlator I output (solid) with the mitigation algorithm model (dashed). The vertical line is at the Time of Arrival of the incident wave, which does not produce a local peak. The model is a good fit to the data except near zero.

FIG. 12 compares the correlator Q output (solid) with the model Q data (dashed). The low amplitude of the raw data has degraded the fit. The vertical line occurs at the Time of Arrival of the incident signal. The Time of Arrival and correlation peak appears to be unrelated.

FIG. 13 presents both the Inphase (I) components (dotted) and the Quadrature Phase (Q) components (dashed). Note that the vertical line is at the correlation peak of the first I component. The corresponding Q component is barely visible. This is a normal result of the phase of the first I/Q component being near $\pi$. Note that the correct TOA is salvaged from the raw data by the mitigation algorithm.

The present invention has been described in relation to particular embodiments, which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

We claim:

1. A method of determining the time of arrival of an incident signal transmitted utilizing a code word, wherein the transmitted incident signal is interspersed with noise and diffracted and reflected signals of said incident signal, which are collectively defined as a combined signal, said method comprising:

generating an autocorrelation of the incident signal;

approximating the autocorrelation;

receiving said combined signal;

using the code word to apply a correlation function to the received combined signal to produce a correlation;

creating a model of the correlation by superimposing a plurality of autocorrelation approximations, each of said approximations having a shape similar to that of the others but having variable amplitude and phase characteristics;

using a multipath mitigation algorithm to compare the difference between the model of the correlation and the correlation to determine whether the model of the correlation and the correlation are similar with respect to amplitude and phase within a predetermined error bound;

modifying the model of the correlation with respect to amplitude and phase if it is not similar to the correlation within the predetermined error bound;

selecting from the plurality of superimposed autocorrelation approximations the approximation that corresponds to the incident signal if the resultant of the comparison between the model of the correlation and the correlation is within the predetermined error bound; and providing the time of arrival corresponding to the incident signal based on the selected autocorrelation approximation.

2. The method of claim 1, wherein said received combined signal is demodulated from analog parameters into digital In-phase and Quadrature phase components.

3. The method of claim 1 wherein said code word is obtained from a baseband transmission.

4. The method of claim 1, wherein a least squares cubic spline is utilized to approximate the autocorrelation.

5. The method of claim 1, wherein said multipath mitigation algorithm includes using a recursive iterated Kalman filter to compare the model of the correlation to the correlation.

6. A method of determining the location of a transmitter utilized to transmit an incident signal, wherein the incident signal is transmitted utilizing a code word and is interspersed with noise and diffracted and reflected signals of said incident signal, which are collectively defined as the combined signal, said method comprising:

generating an autocorrelation of the incident signal;

approximating the autocorrelation;

receiving said combined signal;

using the code word to apply a correlation function to the received combined signal to produce a correlation;

creating a model of the correlation by superimposing a plurality of autocorrelation approximations, each of said approximations having a shape similar to that of the others but having variable amplitude and phase characteristics;

using a multipath mitigation algorithm to compare the difference between the model of the correlation and the correlation to determine whether the model of the correlation and the correlation are similar with respect to amplitude and phase within a predetermined error bound;

modifying the model of the correlation with respect to amplitude and phase if it is not similar to the correlation within the predetermined error bound;

selecting from the plurality of superimposed autocorrelation approximations the approximation that corresponds to the incident signal if the resultant of the comparison between the model of the correlation and the correlation is within the predetermined error bound;

providing the time of arrival corresponding to the incident signal based on the selected autocorrelation approximation; and determining the location of said transmitter based on the provided time of arrival corresponding to the incident signal.

7. The method of claim 6, wherein said received combined signal is demodulated from analog parameters into digital In-phase and Quadrature phase components.

8. The method of claim 6 wherein said code signal is obtained from a baseband transmission.

9. The method of claim 6, wherein a least squares cubic spline is utilized to approximate the autocorrelation.

10. The method of claim 6, wherein said multipath mitigation algorithm includes using a recursive iterated Kalman filter to compare the model of the correlation to the correlation.

11. The method of claim 6, wherein a rectilinear position processor determines the location of said transmitter utilizing the provided time of arrival of the incident signal.

12. A method of determining the time of arrival of an incident signal transmitted utilizing a code word, wherein the transmitted incident signal is interspersed with noise and diffracted and reflected signals of said incident signal, which are collectively defined as a combined signal, said method comprising:

generating an autocorrelation of the incident signal;

approximating the autocorrelation using a least squares cubic spline;

receiving said combined signal;

using the code word to apply a correlation function to the received combined signal to produce a correlation;

superimposing a plurality of autocorrelation approximations, each of said approximations having a shape similar to that of the others but having variable amplitude and phase characteristics;

comparing the difference between the model of the correlation and the correlation using a recursive iterated Kalman filter to determine whether the model of the correlation and the correlation are similar with respect to amplitude and phase within a predetermined error bound;

modifying the model of the correlation with respect to amplitude and phase if it is not similar to the correlation within the predetermined error bound;

selecting from the plurality of superimposed autocorrelation approximations the approximation that corresponds to the incident signal if the resultant of the comparison between the model of the correlation and the correlation is within the predetermined error bound; and providing the time of arrival corresponding to the incident signal.

13. The method of claim 12, wherein said received combined signal is demodulated from analog parameters into digital In-phase and Quadrature phase components.

14. The method of claim 12 wherein said code signal is obtained from a baseband transmission.

15. A radio locating system for determining the location of a transmitter utilized to transmit an incident signal, wherein the incident signal is transmitted utilizing a code word and is interspersed with noise and diffracted and reflected signals of said incident signal, which are defined as the combined signal, said system comprising:

means for receiving said combined signal and said code word;

a correlator for comparing said combined signal received from the receiving means with said code word to obtain a correlation that corresponds to the combined signal;

a means for implementing a multipath mitigation algorithm that uses the correlation for mitigating the influence of said diffracted and reflected signals to determine the time of arrival of said incident signal; and a position processor which utilizes the time of arrival of said incident signal to determine the location of said transmitter.

16. The system of claim 15, wherein a demodulator converts said received combined signal from analog parameters into digital In-phase and Quadrature phase components.

17. The system of claim 15, wherein said code signal is obtained from a baseband transmission.

18. The system of claim 15, wherein a least squares cubic spline is used to model an autocorrelation of the incident signal.

19. The system of claim 15, wherein the multipath mitigation algorithm is a recursive iterated Kalman filter.

20. The system of claim 15, wherein the position processor includes a rectilinear position processor.

* * * * *